(12) United States Patent
Takashima et al.

(10) Patent No.: US 6,375,173 B1
(45) Date of Patent: Apr. 23, 2002

(54) VIBRATION-ISOLATING APPARATUS AND METAL STOPPER THEREFOR

(75) Inventors: Yukio Takashima; Tsutomu Hashimoto, both of Osaka (JP)

(73) Assignee: Toyo Tire & Rubber Co., Ltd., Osaka (JP)

(*) Notice: Subject to any disclaimer, the term of this patent is extended or adjusted under 35 U.S.C. 154(b) by 0 days.

(21) Appl. No.: 09/548,422

(22) Filed: Apr. 13, 2000

(30) Foreign Application Priority Data

Apr. 15, 1999 (JP) .......................................... 11-107599
Dec. 8, 1999 (JP) .......................................... 11-349483

(51) Int. Cl.[7] ................................................ F16F 5/00
(52) U.S. Cl. .................................. 267/140.13; 267/219
(58) Field of Search ...................... 267/140.13, 140.12, 267/140.11, 140.14, 219, 220, 35; 248/562, 636

(56) References Cited

U.S. PATENT DOCUMENTS

| 5,215,293 A | 6/1993 | Muramatsu et al. |
| 5,217,211 A | 6/1993 | Ide et al. |
| 5,246,212 A | 9/1993 | Funahashi et al. |
| 5,314,173 A | 5/1994 | Ide et al. |
| 5,642,873 A | 7/1997 | Kato |
| 5,704,598 A | * 1/1998 | Kojima .................. 267/140.13 |

FOREIGN PATENT DOCUMENTS

| JP | 5-3789 | 1/1993 |
| JP | 9-79310 | 3/1997 |

* cited by examiner

*Primary Examiner*—Christopher P. Schwartz
*Assistant Examiner*—C. T. Bartz
(74) *Attorney, Agent, or Firm*—Jordan and Hamburg LLP (57) ABSTRACT

A vibration-isolating apparatus and a metal stopper having an excellent and lasting reliability comprises an outwardly projecting stopper rubber, and a metal stopper fixed to a first fixture so as to surround the stopper rubber. The metal stopper has a first contact surface in parallel with a compression-direction-facing surface of the stopper rubber, a second contact surface in parallel with a radial-direction-facing surface of the stopper rubber and a third contact surface in parallel with a drawing-direction-facing surface of the stopper rubber, and a fourth contact surface in parallel with a circumferential-direction-facing surface of the stopper rubber. The third contact surface inclines at an angle range of 10°–50° with respect to a plane perpendicular to the compression and drawing directions, while an inner edge of the third contact surface projects radially inward from the second contact surface by not less than 10 mm so as not to contact with the vibration-isolating base body.

7 Claims, 7 Drawing Sheets

VIBRATION-ISOLATING APPARATUS AND METAL STOPPER THEREFOR

BACKGROUND OF THE INVENTION

This invention relates to a vibration-isolating apparatus adapted to support a vibration generating member, such as an engine of an automobile in a vibration isolating manner with respect to a body.

As the space saving techniques for the interior of an engine room of an automobile produced in recent years have been developed, functional parts have been miniaturized and arranged in a very narrowly spaced condition. Therefore, the conditions for repairing the functional parts have become increasingly severe, and the creation of functional parts of high durability and reliability has been demanded.

JP-Y1-1993-003789 (JP-Y1-05003789 or Japanese Utility Model Publication Examined No. 3789/1993) discloses a vibration-isolating apparatus (hereinafter referred as Prior Art 1) of the following structure, for supporting an engine in a vibration-isolating manner in such an engine room with respect to a vehicle body. This vibration-isolating apparatus comprises a first fixture secured to a bracket of an engine; a second fixture secured to a body; a vibration-isolating base body formed of an elastic material such as rubber interposed between and connecting together these two fixtures; a stopper rubber projecting outward from the portion of the vibration-isolating base body which is on the side of the second fixture; and a metal stopper fixed to the first fixture so as to surround the stopper rubber. The metal stopper and stopper rubber prevent an excess deformation of the vibration-isolating base body. The metal stopper is formed of a metal plate by bending the same so as to have a substantially sideway-fallen J-shaped cross section so that the metal stopper has contact surfaces respectively parallel to stopper surfaces of the stopper rubber, stoppering action is achieved in all of the following three directions—compression and drawing directions in which the first and second fixtures are moved relatively toward and away from each other; a radial direction perpendicular to these directions, for example, forward or backward direction of the vehicle; and a circumferential direction, for example, rightward or leftward direction of the vehicle. This metal stopper prevents damage on the elastic material constituting the vibration-isolating base body and stopper rubber.

On the other hand, JP-A-1997-079310 (JP-A-09079310, or Japanese Patent Publication Unexamined No. 79310/1997) discloses another vibration-isolating apparatus (hereinafter, referred as Prior Art 2) of the following structure. This apparatus includes a metal stopper which has the same shape as mentioned above and serves for restring displacements between upper and lower fixtures in all of following direction—compression and drawing directions in which the first and second fixtures are moved relatively toward and away from each other; a radial direction perpendicular to these directions, for example, forward or backward direction of the vehicle; and a circumferential direction, for example, rightward or leftward direction of the vehicle. The metal stopper is formed by bending a plate or sheet so as to have a substantially sideway-fallen J-shaped cross section and so as to be combined firmly with the first fixture. The metal stopper is bonded firmly to an upper part of a vibration-isolating base body formed of an elastic member such as rubber, in such a manner that the metal stopper is opposed to a stopper rubber.

In such vibration-isolating apparatuses, the durability and reliability thereof have increasingly been demanded.

Especially, because an upward-facing contact surface of the metal stopper, which surface abuts on the stopper rubber when the metal stopper is displaced greatly in the drawing direction, has to come to the lower side of the stopper rubber by moving around the stopper rubber, it is desired that a slip-off of the metal stopper can be prevented even when a momentary large stress in drawing direction is applied.

However, the above-described vibration-isolating apparatus of Prior Art 2 is not satisfactory concerning its ability to prevent a slip-off of the metal stopper.

In view of the above, the present invention is aimed to provide a vibration-isolating apparatus and a metal stopper therefor which have a long-lasting durability and reliability.

As for Prior Art 1, in which a metal stopper is formed so as to surround a stopper rubber in three directions, the spatial dimensions for a stopper mechanism increases to cause a problem to occur in the mountability thereof.

The vibration-isolating apparatus supporting the engine is fixed in a rightwardly or leftwardly inclined state to a bracket in a vehicle. Therefore, whereas a large stress in rightward or leftward direction rarely cause an excessive stress to be exerted on other parts on the vehicle, a large stress in forward or backward direction causes the stopper rubber to collide with the metal stopper. By the collision, bending stress is exerted on fixing bolts for the second fixture on the lower side due to the reaction ascribed to the impact of the collision. This exerts an ill influence upon the sealability and fastening force between the lower side fixture and fixing bolts, and causes problems to occur in the reliability of the apparatus.

In the Prior Art 2, the metal stopper is merely formed by bending a plate or sheet so as to have a substantially sideway-fallen J-shaped cross section. Since this metal stopper has a structure not interfering with the stopper rubber at displacements in the circumferential direction or the forward or backward direction, the mountability of the apparatus is high as compared with that of the Prior Art 1, while the fixture does not have an ill influence upon the fixing bolts. However, since the metal stopper is bonded firmly with the elastic body at vulcanization of the elastic body, rubber burr is left on the metal stopper, so that the controlling of a stopper clearance, or distance between abutting surfaces, is difficult.

The metal stopper may be formed separately from the elastic body and assembled thereto later so as to eliminate the problems due to the rubber burr. However, because the metal stopper is formed by merely bending a plate material so as to have a substantially sideway-fallen J-shaped cross section, a required rigidity of the metal stopper cannot be maintained against a large stress in the compression and drawing directions or in the lateral direction. When a flange is formed by bending the edges on circumferential-direction-wise end of the metal stopper in order to maintain the rigidity of the metal stopper, the flange necessarily hits the stopper rubber. Consequently, the Prior Art 2 has problems similar to those of the Prior Art 1.

In view of the above, second object of the present invention is solving at once the above-mentioned problems of the prior art, and for achieving altogether following—the improvement of the mountability of the apparatus; the prevention of circumferential-direction-wise interference of the metal stopper with the stopper rubber; and an increase in the rigidity of the metal stopper.

BRIEF SUMMARY OF THE INVENTION

First aspect of the present invention provides a vibration-isolating apparatus, having a structure basically identical with Prior Arts 1 and 2, capable to prevent a slip-off of the metal stopper in the drawing direction by improving the metal stopper, and thereby improve the durability and reliability of the apparatus.

According to the first aspect, the vibration-isolating apparatus includes a first fixture; a second fixture; a vibration-isolating base body interposed between these two fixtures and formed of an elastic material having rubber-like elasticity; a stopper rubber projecting outward so as to restrict a large displacement of the vibration-isolating base body; and a metal stopper a surrounding this stopper rubber; and the metal stopper being formed by bending a metal plate or sheet. The metal stopper has contact surfaces respectively parallel to stopper surfaces of the stopper rubber, for restricting displacements in following direction—a compression direction in which the first and second fixtures are moved relatively toward each other; a drawing direction in which the first and second fixtures are moved away from each other; a radial direction perpendicular to the compression and drawing directions; and a circumferential direction. A drawing-side contact surface of the metal stopper, which is for restricting a displacement in the drawing direction, inclines in an angle range of 10°–50° with respect to a plane perpendicular to the compression and drawing directions. An inner edge of the drawing-side contact surface projects inward from the radial-direction-wise contact surface by a distance which is not smaller than 10 mm, and which permits the inner edge not to contact the vibration-isolating base body. Thus, a slip-off of the metal stopper can be prevented even when a large deformation occurs momentarily in the vibration-isolating base body.

The reason why the angle of inclination of the drawing-side contact surface and the distance by which the inner edges of the drawing-side contact surface projects are set in the mentioned ranges in this vibration apparatus is following—these ranges constitute the necessary and satisfactory conditions for meeting requirements of manufacturing and designing the metal stopper with respect to strength and rigidity. For example, when the angle of inclination is smaller than 10°, difficulties occur in the manufacturing of the metal stopper, and, when the angle of inclination exceeds 50°, there is a fear that the metal stopper slips off when a momentary large displacement of the vibration-isolating base body occurs. When the distance by which the inner edge of the drawing-side contact surface is smaller than 10 mm, there is a fear that the metal stopper slips off when a momentary large displacement of the vibration-isolating base body occurs.

In order to prevent the metal stopper from being slipped off, it is demanded that the metal stopper has such rigidity and strength that does not cause the metal stopper to be elastically deformed even with respect to a momentary large deformation of the vibration-isolating base body. To meet this requirement, it is preferable to set the thickness of the metal stopper large, and secure the rigidity and strength thereof. Generally, the stopper rubber has following structure—a part of an outer circumferential edge of the second fixture is extended radially; an enclosing rubber portion encloses this extended portion; the stopper rubber comes into contact with the metal stopper when the vibration-isolating base body is greatly deformed. Accordingly, it is desirable to set the thickness of the metal stopper larger than that of the extended portion extended from the second fixture, which portion is enclosed in the stopper rubber.

In order to increase the rigidity and strength of the metal stopper, it is preferable that outwardly extending flanges are formed on edge portions of circumferential-direction-wise contact surfaces while an angle at which the flanges are bent set in the range of 45°–90° so as to withstand a large stress.

This vibration-isolating apparatus may be of various kinds as long as it has a stopper mechanism and preferably have high vibration isolating and damping performance.

Second aspect of the present invention is to achieve the second object of the invention mentioned earlier, by adopting the following structure for the metal stopper.

A vibration-isolating apparatus of this aspect of the invention, which has same basic construction as in the first aspect of the invention, comprises a first fixture on the upper side; a second fixture on the lower side; a vibration-isolating base body formed of an elastic member having rubber-like elasticity; a stopper rubber projecting outward from the portion of the vibration-isolating base body which portion is on the side of the lower side fixture; and a metal stopper opposed to the stopper rubber. The stopper rubber and the metal stopper serves for restricting displacements in an axial direction in which the first and second fixtures are moved relatively toward and away from each other, and in a radial direction. The metal stopper further comprising a reinforcing flange for enhancing rigidity of the metal stopper, being formed to be continuous radially by downwardly bending an edge of the metal stopper except for a region that is subject to interference of the stopper rubber at a time of large displacement of the metal stopper in a circumferential direction relative to the stopper rubber; and a rigid reinforcing rib projecting outward from a circumferential-direction-wise center portion of the metal stopper except for a region having the reinforcing flange, so that the rigid reinforcing rib and the reinforcing flange are formed to be continuous in the radial direction over whole radial dimension of the metal stopper in view from the circumferential direction.

Owing to such a structure, the metal stopper does not interfere with the stopper rubber when the vibration-isolating base body is displaced greatly in the circumferential direction, while the bending rigidity of the metal stopper is improved. Furthermore, since the reinforcing flanges extend downward, the circumferential dimension thereof does not increase, while the efficiencies or easiness for fixing and mounting the metal stopper is improved. Since the metal stopper is formed separately from the elastic body, the controlling of a distance between the metal stopper and the stopper rubber can be done easily, unlike a similar control operation in the prior art.

The reasons for providing the rigid reinforcing rib so as to project outward from a circumferential-direction-wise center portion of the metal stopper reside in that, when the reinforcing rib is formed on a circumferential-direction-wise end portion, it substantially becomes an extension of the reinforcing flanges and interferes with the stopper rubber at a large displacement in the circumferential direction. When the reinforcing rib is projected inward, it also interferes with the stopper rubber.

Forming the reinforcing flanges and reinforcing rib continuously in the lateral direction mentioned above does not mean that both of these parts are in a physically continuous state but it means that the reinforcing flanges and reinforcing rib are joined together in the radial direction when the metal stopper is viewed in the circumferential direction. The reinforcing flanges may not be formed over the whole radial dimension of the metal stopper as long as the metal stopper can secure a predetermined level of bending rigidity. The reinforcing flanges may be formed to be starting from a radially outside intermediate portion thereof. Concretely speaking, the reinforcing flanges may be formed to be starting from a radial-direction-wise intermediate part of a flat portion that will be described later.

The metal stopper is opposed to the stopper rubber provided on the radially outer side of the elastic body that is bonded to upper and lower fixtures at a vulcanization process. The metal stopper is formed by press-working one single piece of pressed steel plate. The metal stopper has a flat plate portion contacting the upper fixture; an upper stopper portion extending from one radial-direction-facing edge of the flat plate portion; a radially-inward-facing stopper portion continuing from the upper stopper portion; and a lower stopper portion continuing from the radially-inward-facing stopper portion. Thus, stopper functions are displayed against displacements in axial and radial directions.

It is especially desirable for combining a construction of the lower stopper portion in the first aspect of the invention to this second aspect of the invention, in order for preventing a slip-off of the metal stopper when a large deformation of the vibration-isolating base body occurs in the drawing direction. Namely, the angle of inclination of the lower stopper portion is set in the range of 10°–50° with respect to a plane perpendicular to a vertical direction in which the two fixtures are moved relatively toward and away from each other. Further, an inner edge of the drawing-wise contact surface projects radially inward from the second contact surface by not less than 10 mm so as not to contact with the vibration-isolating base body.

It is preferable to place a pair of such vibration-isolating apparatuses on left and right portions of the interior of an engine room of an automobile, and fix the apparatuses to rightwardly and leftwardly inclined brackets associated with a vehicle body, by using fixing bolts projecting downward from the lower fixtures of these apparatuses. However, vibration-isolating apparatuses may be disposed in a various manner other than the above.

When these apparatuses are fixed to the rightwardly and leftwardly inclined brackets in the automobile, the fixing bolts of the upper and lower fixtures are inclined in accordance with the inclination of the brackets in the vehicle. Therefore, even when stress should be exerted on the apparatuses in the rightward or leftward direction, the bending stress exerted on the fixing bolts of the lower fixture also becomes small, so that the damage to the fixing bolts and to sealing between the lower fixtures and the fixing bolts decrease.

Because the vibration-isolating apparatuses in this aspect do not have a stopper mechanism for restricting a displacement in a circumferential direction that coincides to rightward or leftward direction of the vehicle, it is preferable to use another vibration-isolating apparatus having a stopper mechanism for restricting a displacement in forward or backward direction of the vehicle, on forward side or backward side of the engine room.

This vibration-isolating apparatus may be of various kinds as long as it has a stopper mechanism and preferably have high vibration isolating and damping performance.

DETAILED DESCRIPTION OF THE INVENTION

Preferred embodiments of the vibration-isolating apparatus according to the present invention will now be described with reference to the drawings. The present invention is not limited to these embodiments.

Figure 1:
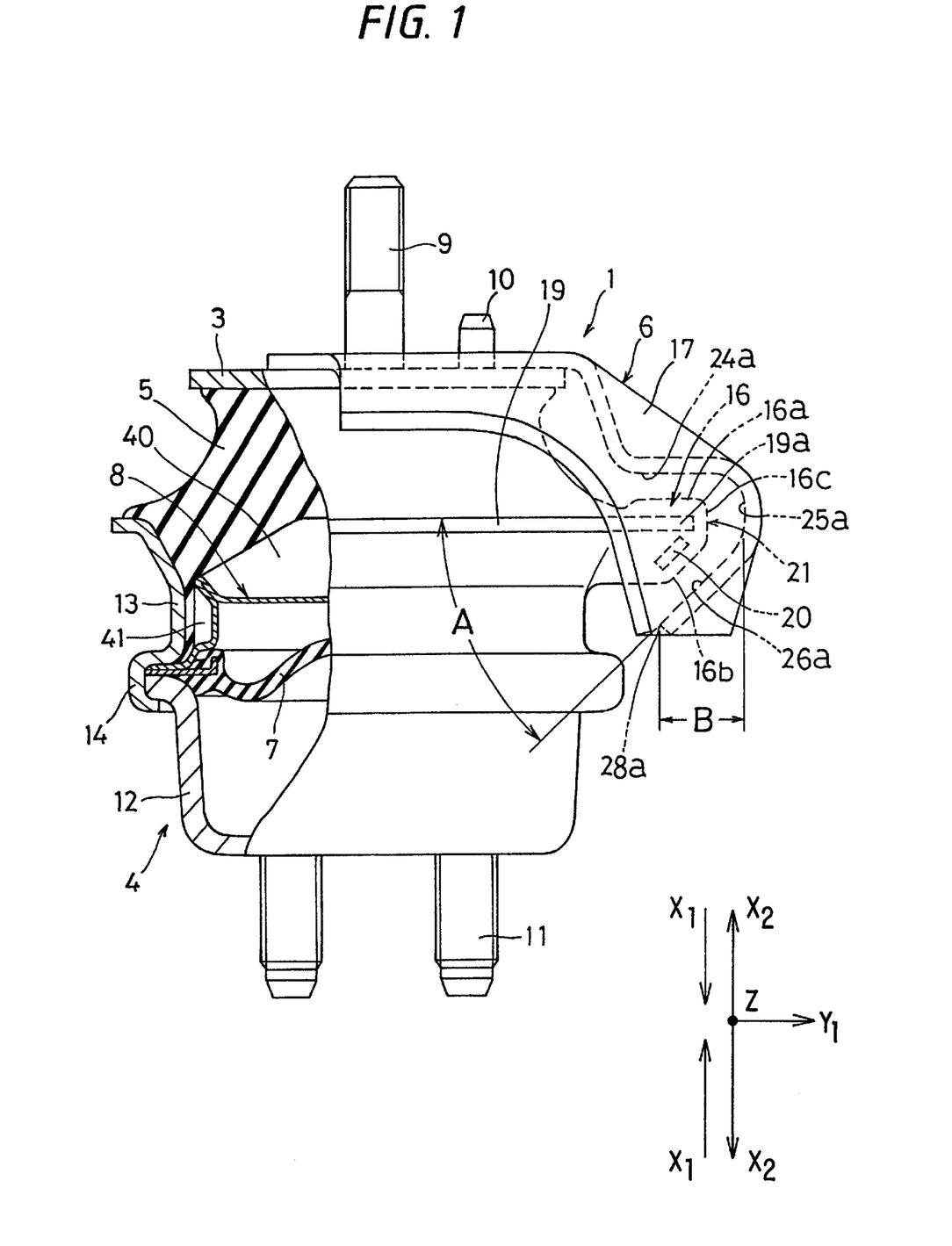
FIG. 1 is a partially cutaway front view showing an embodiment of the first vibration-isolating apparatus according to the present invention.
Figure 2:
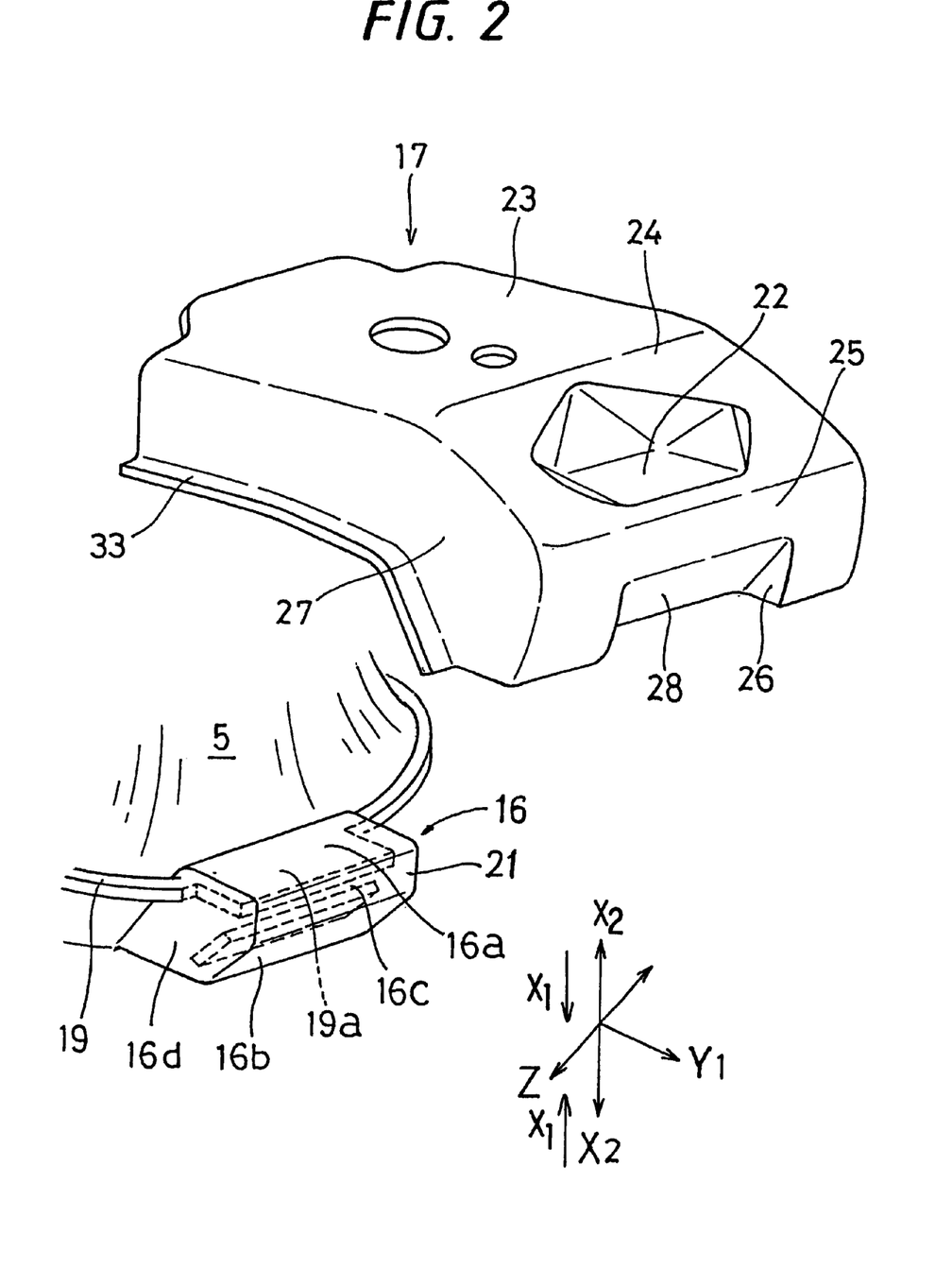
FIG. 2 is a perspective view of a metal stopper in this embodiment.
Figure 3:
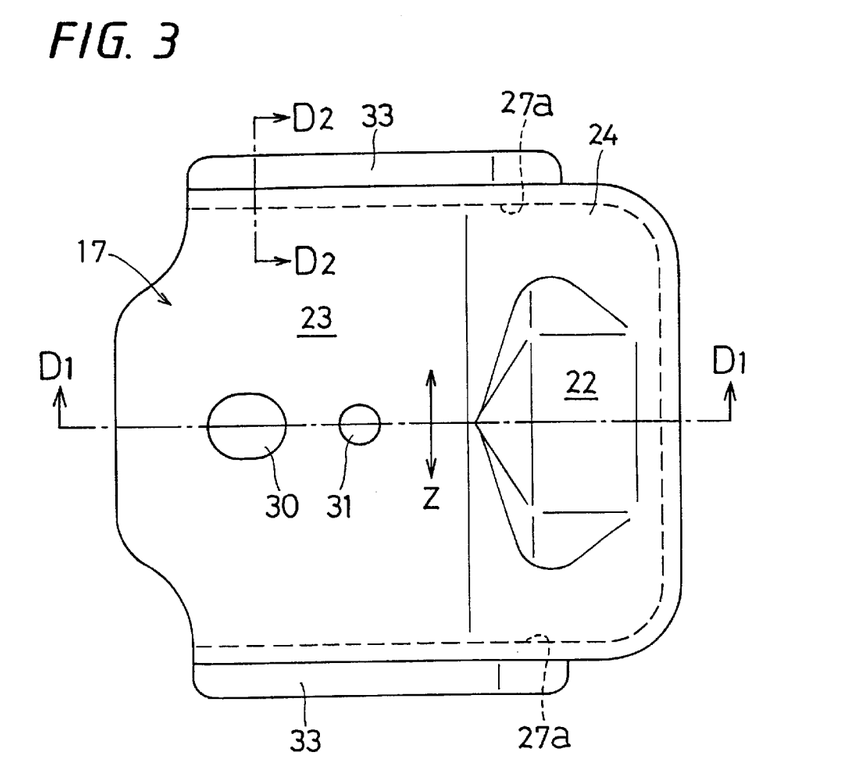
FIG. 3 is a plan view of this metal stopper.
Figure 4:
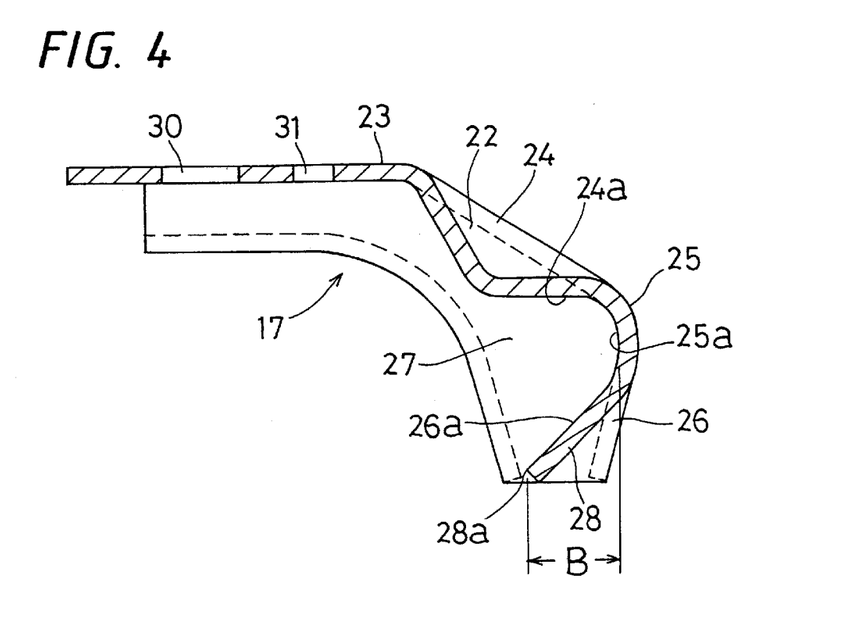
FIG. 4 is a sectional view taken along the line D1—D1 in FIG. 3.
Figure 5:
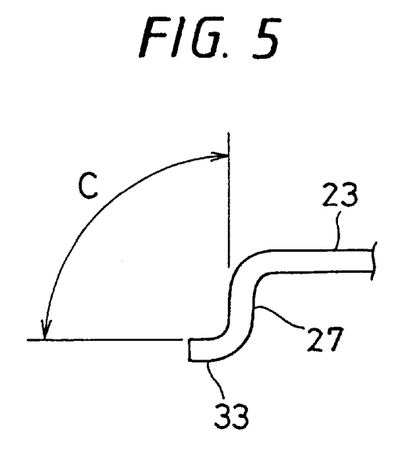
FIG. 5 is a sectional view taken along the line D2—D2 in FIG. 4.

FIG. 1 is a front view of a vibration-isolating apparatus showing a first embodiment of the present invention, FIG. 2 a perspective view of a metal stopper in this embodiment, FIG. 3 a plan view of this metal stopper, FIG. 4 a sectioned front elevation taken along the line D1—D1 in FIG. 3, and FIG. 5 a sectional view taken along the line D2—D2 in FIG. 3.

As shown in the drawings, a vibration-isolating apparatus 1 in this embodiment is for supporting an engine of an automobile in a vibration-isolating manner from a vehicle body. The vibration-isolating apparatus 1 comprises a first and upper fixture 3 secured to a bracket in an engine; a second and lower fixture 4 fixed to the vehicle body; a vibration-isolating base body 5 formed of an elastic material interposed between the first and second fixtures 3, 4; and a stopper mechanism 6 for restricting a large displacement between the fixtures 3, 4 due to an elastic deformation of the vibration-isolating base body 5. The vibration-isolating base body 5 is bonded during its vulcanization process onto each of the first and second fixtures 3, 4 so that the first and second fixtures are joined together. The elastic material forming the vibration-isolating base body 5 has a rubber-like elasticity shown by rubber materials and similar materials. The term of "rubber-like elasticity" means elasticity ascribed to entropy decrease of increase of molecular-chain-lattice structure, which elasticity is characterized by far smaller young modulus and far larger elongation until elastic limit compared with metal or glass.

The vibration-isolating apparatus 1 of this embodiment, which is a liquid-sealed vibration-isolating apparatus, further comprises a diaphragm 7, partition 8 and an orifice 41 in an inner portion of the apparatus. The diaphragm 7 formed of a rubber film is disposed on the side of the second and lower fixture 4 so as to be opposed to the vibration base member 5. The diaphragm 7 and the vibration base member 5 constitute a liquid chamber 40, into which a liquid is sealed. The partition 8 divides the liquid chamber 40 into two sub chambers, which are communicated with each other through the orifice 41.

A pair of the vibration-isolating apparatuses 1 are mounted on a vehicle body in a mutually opposed state on left and right sides of an engine, in an engine room of an automobile, to support the engine in a vibration-isolating manner, as will be described later on explanation of the second embodiment.

In each of these vibration-isolating apparatuses 1, the first and upper fixture 3 is shaped as a flat plate, at center portion of which a fixing bolt 9 projecting upward and a positioning pin 10 for positioning a metal stopper 17 are fixedly provided. The fixing bolt 9 is screwed on a bracket of the engine.

The second and lower fixture 4 has a shape of a cup or an upwardly opened vessel. The second fixture 4 is constituted by a bottomed barrel member 12 fixedly provided with fixing bolts 11 to be fastened to a vehicle body, and a central-trunk barrel member 13 caulked as connected to the bottomed barrel member 12. At inside of the second fixture 4, the diaphragm 7 and a partition 8 are fixed by a caulked portion 14 connecting the barrel members 12, 13.

The vibration-isolating base body 5 formed of the elastic material is shaped like an umbrella and is bonded to the first fixture 3 and to the central-trunk barrel member 13 of the second fixture 4 at a vulcanization process of the elastic material.

The stopper mechanism (stabilizer mechanism) 6 prevents an excessive deformation of the vibration-isolating base body 5 by contacting at a portion of outer surface of the vibration-isolating base body 5, for the purpose of size reduction in the engine room. The stopper mechanism 6 is comprised by a stopper rubber 16 outwardly projecting from a second-fixture-side portion of the vibration-isolating base body, and a metal stopper 17 associated with the first fixture 3.

The stopper rubber 16 is comprised by an extended flange portion 19a extended radially outward from a portion of a flange-shaped outer circumferential edge 19 at an upper end of the central-trunk barrel member 13; a reinforcing metal member 20 disposed obliquely on the lower side of an outer end of the extended flange portion 19a; and an enclosing rubber portion 21 extended from the vibration-isolating base body 5 so as to enclose the extended flange portion 19a and reinforcing metal member 20.

As shown in FIG. 2, an upward-facing stopper surface 16a of the enclosing rubber portion 21 is parallel to a plane perpendicular to the compression and drawing directions X1, X2 (axial direction of the fixing bolt 9, i.e. axial direction of the vibration-isolating apparatus 1) of the vibration-isolating base body 5, or to a surface of the extended flange portion 19a. A downward-facing stopper surface 16b of the enclosing rubber portion 21 is inclined at an angle range of 10°–50° (45° in a shown example of this embodiment) with respect to the surface of the extended flange portion 19a that is perpendicular to the compression and drawing directions X1, X2. The downward-facing stopper surface 16b is parallel to the inclined reinforcing metal member 20. A radially-outward-facing stopper surface 16c (facing outward in a radial direction Y1) of the enclosing rubber portion 21, which surface is outside of an outer edge of the extended flange portion 19a, is parallel to the compression and drawing directions X1, X2, and is perpendicular to the surface of the extended flange portion 19a. Circumferentially-outward-facing stopper surfaces 16d (facing outward in the circumferential direction Z, that is perpendicular to the paper surface of FIG. 1) of the enclosing rubber portion 21 are perpendicular to the radially-outward-facing stopper surface 16c.

The metal stopper 17 is formed from a single piece of metal plate or sheet by bend-working such as press-working. Thickness of the metal plate or sheet is adopted to be larger than that of the extended flange portion 19a associated with the second fixture 4 so as to secure rigidity of the metal stopper 17, or the product of the bend-working.

The metal stopper 17 is comprised by a flat base-plate portion 23; a first and upper stopper portion 24 extending from a radially outer edge of the flat base-plate portion so as to enclose the stopper rubber 16 and restricting a displacement in the compression direction X1 of the stopper rubber 16 to a predetermined range; a second stopper portion 25 formed continuously from the first stopper portion 24 and restricting a displacement in the radial direction Y1 of the stopper rubber 16, for example, in rightward or leftward direction of the vehicle, to a predetermined range; a third and lower stopper portion 26 formed continuously from the second stopper portion 25 and restricting a displacement in the drawing direction X2 of the stopper rubber 16 to a predetermined range; and fourth stopper portions 27 formed by bending the metal stopper at both sides of the flat base-plate portion 23 and first to third stopper portions 24–26 and adapted to restrict a displacement in the circumferential direction Z of the stopper rubber 16, for example, in forward or backward direction, to a predetermined range.

A central part of the first stopper portion 24 bulges toward the stopper rubber 16 to form a bulge 22 that is a recess in a view from upward, so that an downward-facing contact surface 24a on the bulge 22 of the first stopper portion 24 is parallel to the upward-facing stopper surface 16a of the stopper rubber 16. A radially-inward-facing contact surface 25a of the second stopper portion 25 is parallel to the radially-outward-facing stopper surface 16c of the stopper rubber 16, leaving a predetermined distance or clearance between the surfaces 25a and 16c at around 5 mm when the apparatus is mounted on the vehicle body.

A circumferential-wise (Z direction-wise) intermediate part of the third and lower stopper portion 26 is bent toward the stopper rubber 16 to form an inclined section 28. An upward-facing contact surface 26a of the inclined section 28 inclines at an angle A (45° in a shown example of this embodiment) of 10°–50° with respect to a plane perpendicular to the compression and drawing directions X1, X2 or to a surface of the extended flange portion 19a. A radially inward edge 28a of the contact surface 26a projects radially inward from the contact surface 25a of the second stopper portion 25 by a distance B which is not smaller than 10 mm, and which is in a range not causing contact between the radially inward edge 28a and the vibration-isolating base body 5. By such construction, coming-off of the metal stopper 17 from the stopper rubber 16 is prevented.

Circumferentially-inward-facing contact surfaces 27a of the fourth stopper portion 27 are in parallel to the circumferentially-outward-facing stopper surfaces 16d of the stopper rubber 16.

Therefore, the contact surfaces 24a, 25a, 26a, 27a disposed on the inner faces of the first to fourth stopper portions 24–27 are respectively parallel to the stopper surfaces 16a–16d of the stopper rubber 16. The contact surfaces 24a, 25a, 26a, 27a are respectively perpendicular to the compression direction X1 in which the first and second fixtures 3, 4 are moved relatively toward each other; the drawing direction X2 in which these members 3, 4 are moved relatively away from each other; and the radial direction Y1 perpendicular to the directions X1, X2; and circumferential direction Z.

The flat base-plate portion 23 is adapted to make a surface-to-surface contact with the first and upper fixture 3. The flat base-plate portion 23 has an elongated through hole 30 through which the fixing bolt 9 can be inserted; and a positioning hole 31 through which the positioning pin 10 is inserted and held, whereby the metal stopper 17 is positioned and fixed. The reason why the through hole 30 for the fixing bolt 9 is elongated in the radial direction Y is that the third stopper portion 26 has to be come to the lower side of the stopper rubber 16 by way around the stopper rubber 16, when assembling of the metal stopper 17 with main part of the vibration-isolating apparatus 1.

Downward edges of the fourth stopper portion 27, that is, downward edges of the contact surface extending in the circumferential direction Z, are outwardly bent toward the Z direction at an angle C of 45°–90° (90° in a shown example of this embodiment). In this way, strength of the metal stopper is enhanced to reliably withstand a large displacement.

The liquid-sealed type vibration-isolating apparatus 1 is adapted to damp various kinds of vibrations occurring due to the operation of the engine or during the travel of the vehicle. In the vibration-isolating apparatus 1, a vibration insulating function is based on the internal friction occurring during the elastic deformation of the vibration-isolating base body, while a vibration damping function is based on the effect of a liquid flow owing to the orifice 41 formed by the partition 8 in the interior of the liquid chamber 40. Since the matter is not strictly necessary for the understanding of the present invention, a detailed description thereof is omitted.

The metal stopper 17 constructed as described above is assembled with a main part of the vibration-isolating apparatus 1, in a following manner. Firstly, the fixing bolt 9 for the first and upper fixture 3 is inserted through the through hole 30 of the metal stopper 17. At this inserted state, the third stopper portion 26 is shifted to the lower side the stopper rubber 16 through a position on the outer side of the radially outer end of the stopper rubber 16 by moving around the stopper rubber 16. The positioning pin 10 of the first fixture 3 is then fitted into the positioning hole 31 of the metal stopper. The metal stopper 17 is held firmly between the first fixture 3 and the bracket on the engine, while the second fixture 4 is fixed to the bracket on the vehicle body.

In the vibration-isolating apparatus 1 with which the metal stopper is thus combined, the contact surfaces 24a, 25a, 26a, 27a of the metal stopper 17 are parallel to the stopper surfaces 16a–16d of the stopper rubber 16 with keeping respective predetermined distance or clearance between them. For example, the clearances of around 5 mm are kept when the vibration-isolating apparatus is mounted on a vehicle properly. A large displacement exceeding a predetermined level is prevented owing to the abutting of the stopper surfaces of the stopper rubber 16 against contact surfaces of the metal stopper 17.

Concretely speaking, the displacement in the compression direction X1 for the vibration-isolating base body 5 is restricted by the contact surface 24a of the first upper stopper portion 24. The displacement in the drawing direction X2 for the vibration-isolating base body 5 is restricted by the contact surface 26a of the inclined section 28 of the third lower stopper portion 26. The displacement in the radial direction Y1 of the vibration-isolating base body 5, for example, rightward or leftward direction of the vehicle is restricted by the contact surface 25a of the second stopper portion 25. The displacement in the circumferential direction Z, for example, forward or backward direction of the vehicle is restricted by the contact surface 27a of the fourth stopper portion 27. Since the stopper surfaces 16a–16d of the stopper rubber 16 and the contact surfaces 24a, 25a, 26a, 27a are kept parallel to each other, a surface pressure is low at the time of abutting on each other. Thus, durability of the metal stopper and stopper rubber is improved.

Because the radially inward edge of the upward-facing contact surface 26a projects sufficiently toward a main part of the vibration-isolating apparatus 1, a slip-off of the metal stopper 17 is prevented, even when a large stress is applied on the vibration-isolating base body 5 momentarily in the drawing direction. Since the thickness of the metal stopper 17 is set larger than that of the flange 19, the rigidity of the metal stopper can be secured even when the metal stopper receives a large load from the stopper rubber 16. In this way, the metal stopper 17 is capable of preventing a slip-off thereof and having a high durability.

Furthermore, the outwardly extending flanges 33 are provided on the fourth stopper portions 27 positioned on both sides of the metal stopper 17, in such a manner that the flanges 33 are at substantially 90° with respect to the fourth stopper portions 27. In this way, strength of the metal stopper 17 is further enhanced to withstand a large stress.

Since the bending angle to form the upward-facing contact surface 26a as well as projecting distance B of the inward edge of the contact surface 26a are set in the above-described ranges, the slip-off of the metal stopper is prevented even when large stress is applied on the vibration-isolating base body. Thus, lasting durability and reliability of the vibration-isolating apparatus are secured.

Figure 6:
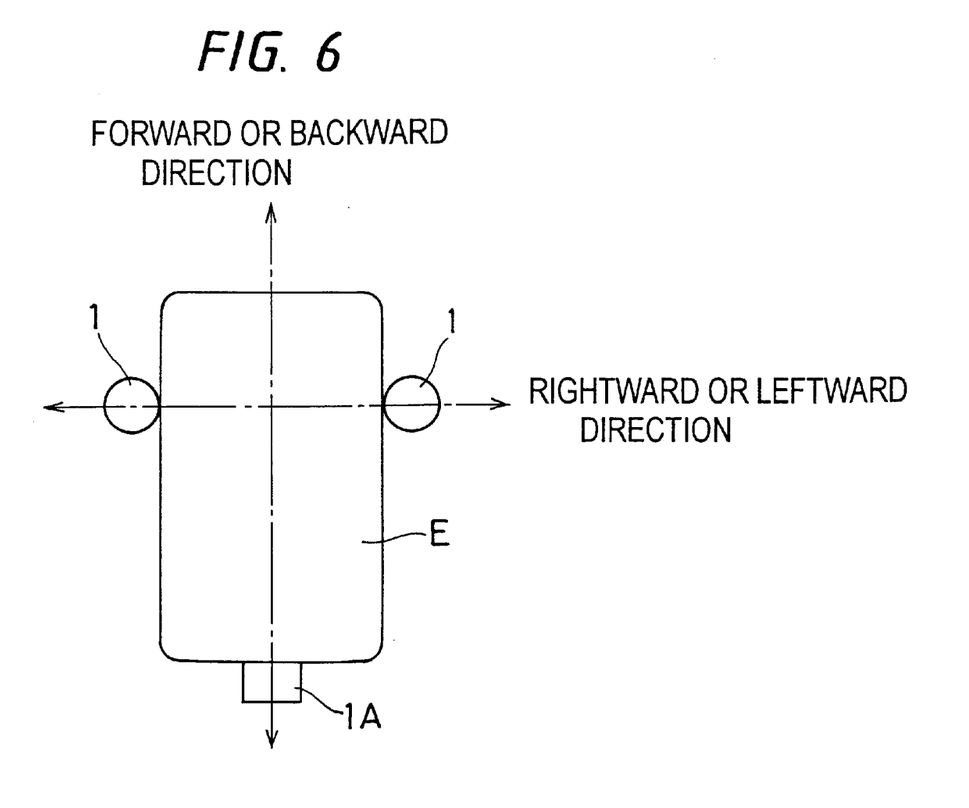
FIG. 6 is a schematic view illustrating an engine support structure formed of vibration-isolating apparatuses.
Figure 7:
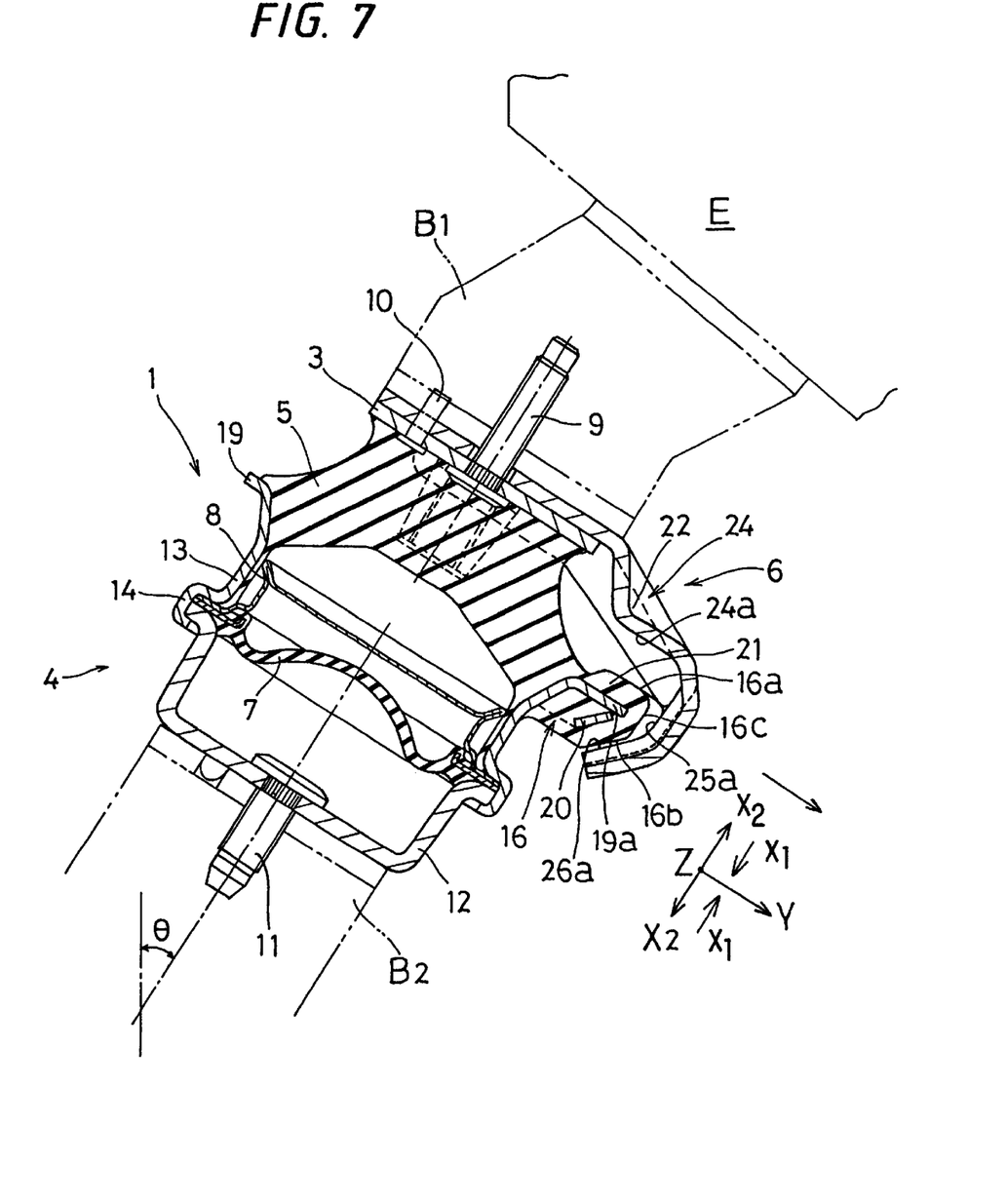
FIG. 7 is a sectional view showing an embodiment of the second vibration-isolating apparatus according to the present invention.
Figure 8:
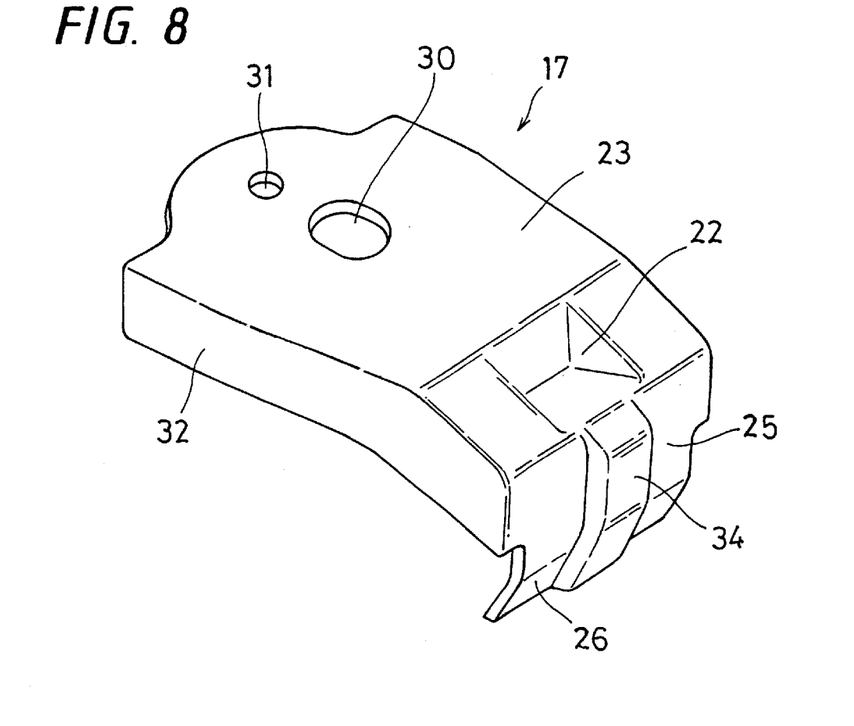
FIG. 8 is a perspective view of a metal stopper in this embodiment.
Figure 9:
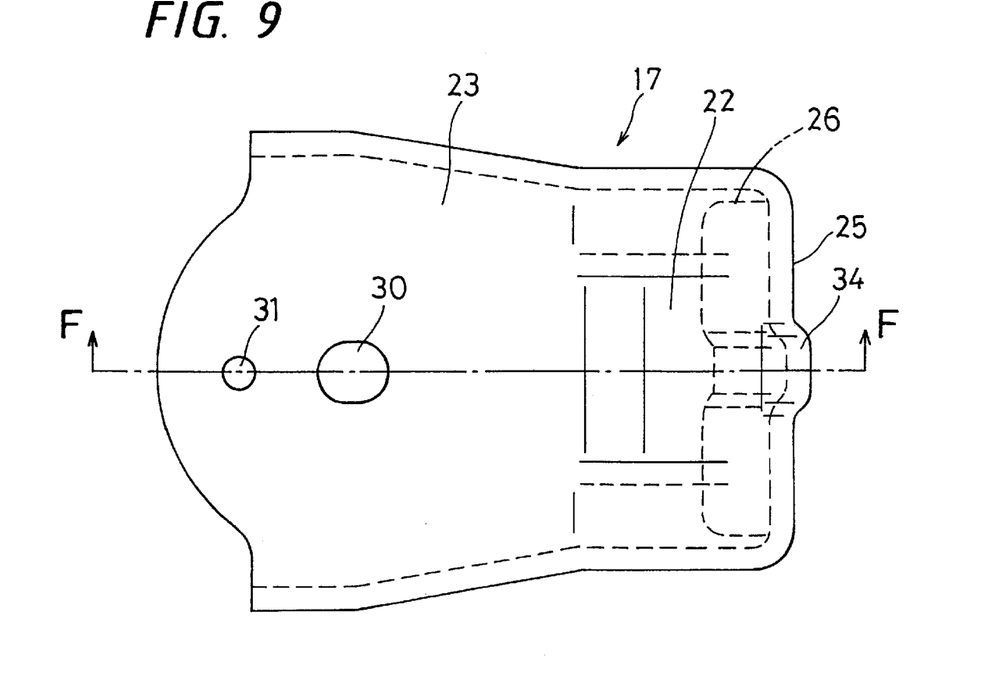
FIG. 9 is a plan view of this metal stopper.
Figure 10:
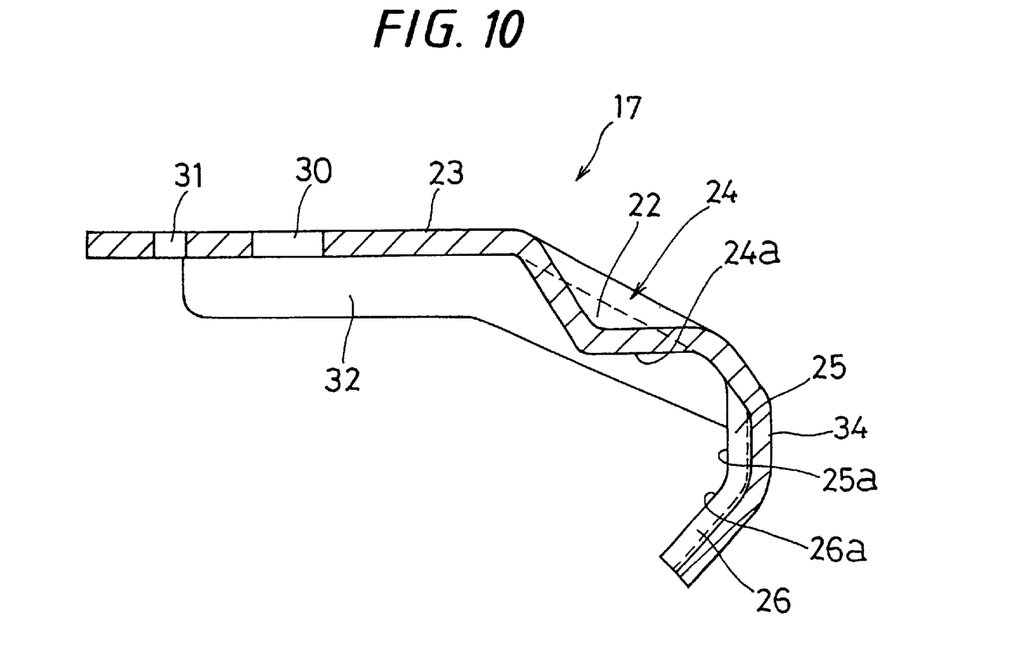
FIG. 10 is a sectional view taken along the line F—F in FIG. 9.

FIG. 6 illustrates an engine support structure using a vibration-isolating apparatuses according to the second embodiment; FIG. 7 a sectional view of the vibration-isolating apparatus; FIG. 8 a perspective view of a metal stopper in the second embodiment; FIG. 9 a plan view of the same metal stopper; FIG. 10 a sectional view taken along the line F—F in FIG. 9; and FIG. 11 a side view of the metal stopper.

As shown in the drawings, the vibration-isolating apparatus 1 in this embodiment is of a liquid-sealed type and supports an engine E of an automobile in a vibration-isolating manner, in the same manner as in the first embodiment. Also as in the first embodiment, the vibration-isolating apparatus 1 in this embodiment comprises a first and upper fixture 3 fixed to a bracket B1 of the engine; a second and lower fixture 4 fixed to a bracket B2 of a body; a vibration-isolating base body 5 interposed between these two fixtures and bonded to the fixtures at vulcanization process thereof; and a stopper mechanism 6 for restricting a displacement between the fixtures 3, 4 ascribed to the elastic deformation of the vibration-isolating base body 5.

Further, as in the first embodiment, the vibration-isolating apparatus 1 in this embodiment comprises a diaphragm 7, partition 8 and an orifice 41 in an inner portion of the apparatus. The diaphragm 7 formed of a rubber film is disposed on the side of the second and lower fixture 4 so as to be opposed to the vibration base member 5. The diaphragm 7 and the vibration base member 5 constitute a liquid chamber 40, into which a liquid is sealed. The partition 8 divides the liquid chamber 40 into two sub chambers, which are communicated with each other through the orifice 41.

A pair of the vibration-isolating apparatus 1 are disposed on both the left and right sides of the engine E in an engine room of an automobile as shown in FIG. 6, in such a manner that the vibration-isolating apparatus 1 are opposed to each other. A fixing bolt 11 projecting downward from the lower fixture 3 of each vibration-isolating apparatus 1 is fastened to one of the left and right brackets B2, which are inclined at an angle θ, of the vehicle body. On a rear end of the engine E, another vibration-isolating apparatus 1A having a stopper mechanism restricting displacements in forward and backward direction of the vehicle is disposed separately from the above-mentioned vibration-isolating apparatuses 1.

In each of these vibration-isolating apparatuses 1, the first and upper fixture 3, second and lower fixture 4 and vibration-isolating base body 5 have the same construction as the corresponding parts of the first embodiment mentioned above. Accordingly, the same structural parts are designated by the same reference numerals, and detailed descriptions thereof are omitted.

The basic construction of a stopper rubber 16 in the stopper mechanism 6 is also identical with that of the corresponding part of the first embodiment.

The construction of an extended flange portion 19a extended from a central-trunk barrel member 13 into a stopper rubber 16 as well as the construction of a metal reinforcing member 20 and an enclosing rubber portion 21, for example, are identical with those of the corresponding parts of the first embodiment. However, a circumferential-direction-facing end surface of the stopper rubber, which faces toward a direction perpendicular to the paper surface of FIG. 7, does not serve as a stopper surface or contact surface.

As shown in FIG. 7, an upward-facing stopper surface 16a of the enclosing rubber portion 21 is parallel to a plane perpendicular to the compression and drawing directions X1, X2 (axial direction of the fixing bolt 9, i.e. axial direction of the vibration-isolating apparatus 1) of the vibration-isolating base body 5, or to a surface of the extended flange portion 19a. A downward-facing stopper surface 16b of the enclosing rubber portion 21 is inclined with respect to the surface of the extended flange portion 19a that is perpendicular to the compression and drawing directions X1, X2. The downward-facing stopper surface 16b is parallel to the inclined reinforcing metal member 20. A radially-outward-facing stopper surface 16c (facing outward in a radial direction Y1 that coincides with rightward or leftward direction of the vehicle) of the enclosing rubber portion 21, which surface is outside of an outer edge of the extended flange portion 19a, is parallel to the compression and drawing directions X1, X2, and is perpendicular to the surface of the extended flange portion 19a.

The metal stopper 17 in the stopper mechanism 6 is formed from a single piece of pressed steel plate or sheet by bend-working such as press-working. Whereas this metal stopper 17 basically has the same structure as that in the first embodiment, it does not have a fourth stopper portion for restricting a displacement in the circumferential direction, for example, forward or backward direction of the vehicle to a predetermined level.

This metal stopper 17 is formed to a thickness larger than that of the extended flange portion 19a associated with the lower fixture 4, so as to secure rigidity of the metal stopper 17, or the product of the bend-working. The metal stopper 17 is comprised by a flat base-plate portion 23 contacting the upper fixture 3; a first and upper stopper portion 24 extending from a radially outer edge of the flat base-plate portion; a radially-inward-facing stopper portion 25, or a second stopper portion, formed continuously from the first stopper portion 24; and a third and lower stopper portion 26 formed continuously from the second stopper portion 25 and restricting a displacement in the radial direction Y1. Thus, the metal stopper 17 serves for restricting displacements in upward and downward directions, and in a radial direction.

A central part of the first stopper portion 24 bulges toward the stopper rubber 16 to form a bulge 22 that is a recess in a view from upward, so that an downward-facing contact surface 24a on the bulge 22 of the upper stopper portion 24 is parallel to the upward-facing stopper surface 16a of the stopper rubber 16. A radially-inward-facing contact surface 25a of the radially-inward-facing stopper portion 25 is parallel to the radially-outward-facing stopper surface 16c of the stopper rubber 16, leaving a predetermined distance or clearance between the surfaces 25a and 16c at around 5 mm when the apparatus is mounted on the vehicle body.

The lower stopper portion 26 inclines toward the stopper rubber 16. An upward-facing contact surface 26a of the lower stopper portion 26 is parallel to the downward-facing stopper surface 16b of the stopper rubber 16.

The flat base-plate portion 23 has an elongated through hole 30 through which a fixing bolt 9 can be inserted, and a positioning hole 31 through which a positioning pin 10 is inserted and held. The positioning and fixing of the metal stopper 17 are done by holding the flat plate portion 23 by inserting the fixing bolt 9 and positioning pin 10 therethrough. The reason why the through hole 30 for the fixing bolt 9 is elongated in the radial direction Y is that the third lower stopper portion 26 has to be come to the lower side of the stopper rubber 16 by way around the stopper rubber 16, when assembling of the metal stopper 17 with main part of the vibration-isolating apparatus 1.

Figure 11:
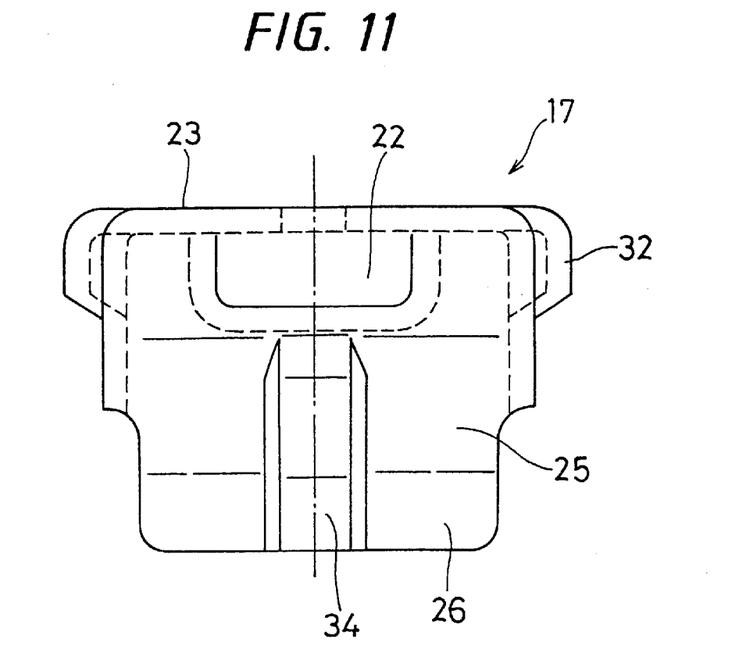
FIG. 11 is a side view of a metal stopper.

The characteristic structure of this metal stopper 17 resides in followings. The metal stopper 17 has downwardly oriented reinforcing flanges 32 for enhancing rigidity of the metal stopper 17 on both edges at circumferential-wise ends of the metal stopper 17. The reinforcing flanges 32 are continuously disposed on the both edges except for a region that is subject to interference of the stopper rubber 16 at a time of large displacement of the metal stopper 17 in a circumferential direction relative to the stopper rubber 16. The reinforcing flanges 32 are formed by bending of the both edges of the metal stopper 17. Concretely speaking, the reinforcing flanges 32 of around 10 mm in axial dimension are formed continuously in the radial direction on the both edges, at circumferential-wise end, of the flat plate portion 23 and an upper section of a radially-inward-facing stopper portion 25. These reinforcing flanges 32 are formed over substantially the whole range of radial dimension of the metal stopper 17. In other words, the reinforcing flanges 32 extend from a radially outermost portion to a radially innermost portion (not correct in a strict sense) or an end portion associated with the positioning hole 31. No flange is formed on an edge associated with the positioning hole 31, which is an edge along the circumferential direction.

Further, the metal stopper 17 has a rigid reinforcing rib 34 projecting radially outward from a circumferential-direction-wise center portion of the metal stopper 17 except for a region having the reinforcing flange 32. Concretely speaking, the reinforcing rib 34 bulges outward by a distance substantially corresponding to the thickness of the metal stopper 17 from the laterally inner stopper portion 25 to the lower stopper portion 26. Therefore, the reinforcing flanges 32 and reinforcing rib 34 are formed to be continuous in the radial direction over whole radial dimension of the metal stopper. 17 in view from the circumferential direction.

The liquid-sealed vibration-isolating apparatus 1 is adapted to damp various kinds of vibrations, which occur due to the operation of the engine E or during the traveling of the vehicle, by the vibration insulating function based on the internal friction occurring during the elastic deformation of the vibration-isolating base body, and the vibration damping function based on the effect of a liquid flow owing to the provision of an orifice formed in a partition in a liquid chamber. Since the structure concerning the matter is not strictly necessary for the understanding of the present invention, a detailed description thereof is omitted.

The metal stopper 17 constructed as described above is assembled with a main part of the vibration-isolating apparatus 1, in a following manner. Firstly, the fixing bolt 9 for the first and upper fixture 3 is inserted through the through hole 30 of the metal stopper 17. At this inserted state, the third stopper portion 26 is shifted to the lower side the stopper rubber 16 through a position on the outer side of the radially outer end of the stopper rubber 16 by moving around the stopper rubber 16. The positioning pin 10 of the first fixture 3 is then fitted into the positioning hole 31 of the metal stopper. The metal stopper 17 is held firmly between the first fixture 3 and the bracket B1 on the engine, while the second fixture 4 is fixed to the bracket B2 on the vehicle body.

By forming the reinforcing flanges 32 and reinforcing rib 34 to be continuous with each other in the radial direction, the rigidity of the metal stopper 17 against bending is enhanced. The reinforcing flanges 32 does not cause increase of a radial-direction-wise dimension of the stopper metal because the reinforcing flanges 32 are formed solely by bending the edges downwardly. Moreover, easiness or efficiency for mounting the vibration-isolating apparatus is higher than that of the Prior Art 1 mentioned before. Meanwhile, the reinforcing flanges 32 and reinforcing rib 34 do not interfere with the rubber stopper 16 even when the metal stopper 17 is circumferentially displaced relative to the rubber stopper 16 due to above-mentioned construction. Furthermore, contrary to the metal stopper of the Prior Art 2, a distance between the metal stopper 17 and stopper rubber 16 can be controlled excellently because the metal stopper and elastic body are formed separately to be assembled later.

The vibration-isolating apparatuses 1 in this embodiment has no stopper mechanism for restricting a displacement in forward or backward direction that is a circumferential direction of the metal stopper 17 is restricted. However, that displacement is restricted by a stopper mechanism in another vibration-isolating apparatus 1A mounted on a rear end of the engine E as shown in FIG. 6. Thus, no problems arise.

The reinforcing flanges and reinforcing rib are formed continuously over the whole radial-direction-wise dimension of the metal stopper so that the metal stopper does not interfere with the stopper rubber when relative displacement in a circumferential direction or forward or back ward direction occurs therebetween. Accordingly, the rigidity against bending and the easiness or efficiency of fixing or mounting of the metal stopper are greatly improved.

What is claimed is:

1. A vibration-isolating apparatus comprising:
   a first fixture;
   a second fixture spaced apart from the first fixture;
   a vibration-isolating base body interposed between and connecting together said first and second fixtures and formed of an elastic material having a rubber-like elasticity;
   a stopper rubber outwardly projecting from a second-fixture-side portion of the vibration-isolating base body so as to restrict a deformation of the vibration-isolating base body, the stopper ruber including a portion of a circumferential edge of the first fixture extended radially outward to form an extended fixture portion that is enclosed by the stopper rubber;
   a metal stopper fixed to the first fixture so as to surround the stopper rubber having a thickness greater than that of the extended fixture portion;
   the metal stopper including:
   a first contact surface in parallel with a compression-direction-facing surface of the stopper rubber in which direction the first and second fixtures are moved relatively toward each other;
   a second contact surface in parallel with a radial-direction-facing surface of the stopper rubber which radial direction is perpendicular to the compression direction;
   a third contact surface in parallel with a drawing-direction-facing surface of the stopper rubber in which direction the first and second fixtures are moved away from each other;
   a fourth contact surface in parallel with a circumferential direction-facing-surface of the stopper rubber; and
   the third contact surface being inclined at an angle in a range of 10°–50° with respect to a plane perpendicular to the compression and drawing directions, while a radially inner edge of the third contact surface projects radially inward from the second contact surface by not less than 10 mm and so as not to contact with the vibration-isolating base body.

2. A vibration-isolating apparatus according to claim 1, wherein an edge of the fourth contact surface of the metal stopper is bent outwardly at an angle range of 45°–90° with respect to the fourth contact surface to form a circumferential-direction-wise outward flange.

3. A vibration-isolating apparatus comprising:
   an upper and first fixture;
   a lower and second fixture spaced apart from the upper fixture;
   a vibration-isolating base body interposed between and connecting together the first and second fixtures and formed of an elastic member having a rubber-like elasticity;
   a stopper rubber outwardly projecting from a lower-fixture-side portion of the vibration-isolating base body for restricting a displacement of the vibration-isolating base body;
   a metal stopper fixed to the first fixture so as to oppose the stopper rubber and engage the stopper to restrict the displacement of the vibration-isolating base body;
   the metal stopper being formed by press-working a single piece of pressed steel plate or sheet and including:
   a flat base-plate portion contacting the upper fixture;
   an upper stopper portion extending from one radial-direction-facing edge of the flat base-plate portion;
   a radially-inward-facing stopper portion continuing from the upper stopper portion and extending downwardly; and
   a lower stopper portion continuing from the radially-inward-facing stopper portion and extending obliquely in a radially inward direction;
   said metal stopper serving for restricting displacements in an axial direction in conjunction with said stopper rubber, in which the upper and lower fixtures are moved relatively toward and away from each other, and in a radial direction in which both the first and second fixtures are moved relative each other; and
   the metal stopper further including:

a reinforcing flange for enhancing rigidity of the metal stopper, being formed to be continuous radially by downwardly bending an edge of the metal stopper, said reinforcing flange not extending to a region that is subject to interference of the stopper rubber at a time of relative displacement of the metal stopper and the stopper rubber in a forward or backward direction; and a rigid reinforcing rib projecting outward from a circumferential-direction-wise center portion of the metal stopper and extending over said radially-inward-facing stopper portion and said lower stopper portion, so that the rigid reinforcing rib and the reinforcing flange are formed to be continuous in the radial direction over a whole radial dimension of the metal stopper in view from the circumferential direction.

4. The vibration-isolating apparatus according to claim 3, wherein the lower stopper portion of the metal stopper inclines at an angle range of 10°–50° with respect to a plane perpendicular to an axial direction in which the upper and lower fixtures are moved relatively toward and away from each other, while an radially inner edge of the lower stopper portion projects radially inward from the radially-inward-facing stopper portion by not less than 10 mm and so as not to contact with the vibration-isolating base body.

5. A pair of vibration-isolating apparatuses each according to claim 3, which are respectively fixed to leftwardly and rightwardly inclined brackets associated with a vehicle body, in an engine room of an automobile, by use of fixing bolts projecting downward from the lower fixtures.

6. An engine support structure for automobiles, comprising:

a pair of vibration-isolating apparatuses each as defined in claim 3, which are respectively fixed to leftwardly and rightwardly inclined brackets associated with a vehicle body, in an engine room of an automobile, by use of fixing bolts projecting downward from the lower fixtures; and another vibration-isolating apparatus being disposed on forward or backward side of the engine room and having a stopper mechanism for restricting a displacement of an engine in forward or backward direction of the automobile, which direction coincides with said circumferential direction of the pair of vibration-isolating apparatuses.

7. A metal stopper for being disposed opposed to a stopper rubber provided on radially-outer side of an elastic body having rubber-like elasticity, which elastic body is bonded by vulcanization onto each of upper and lower fixtures, the metal stopper being formed by press-working a single piece of pressed steel plate or sheet and including:
a flat base-plate portion contacting the upper fixture;
an upper stopper portion extending from one radial-direction-facing edge of the flat base-plate portion;
a radially-inward-facing stopper portion continuing from the upper stopper portion and extending downwardly; and
a lower stopper portion continuing from the radially-inward-facing stopper portion and extending obliquely in a radially inward direction; and said metal stopper serving for restricting displacements in an axial direction in conjunction with said stopper rubber, in which the upper and lower fixtures are moved relatively toward and away from each other, and in a radial direction in which both the first and second fixtures are moved relative each other;

the metal stopper further including:
a reinforcing flange for enhancing rigidity of the metal stopper, being formed to be continuous radially by downwardly bending an edge of the metal stopper, said reinforcing flange not extending to a region that is subject to interference of the stopper rubber at a time of relative displacement of the metal stopper relative to the stopper rubber in forward and backward directions; and a rigid reinforcing rib projecting outward from a circumferential-direction-wise center portion of the metal stopper and extending over said radially-inward-facing stopper portion and said lower stopper portion, so that the rigid reinforcing rib and the reinforcing flange are formed to be continuous in the radial direction over a whole radial dimension of the metal stopper in view from the circumferential direction.

* * * * *